TRANSISTOR LINEAR PEAK DETECTOR FOR SIGNALS HAVING WIDE DYNAMIC RANGE

Filed Aug. 28, 1962

INVENTORS
JEROME C. SQUILLARO
HENRY D. TOLT
BY
H. H. Losche
ATT'YS.

3,145,345
Patented Aug. 18, 1964

3,145,345

TRANSISTOR LINEAR PEAK DETECTOR FOR SIGNALS HAVING WIDE DYNAMIC RANGE

Jerome C. Squillaro, Glen Burnie, and Henry D. Tolj, Lutherville, Md., assignors, by mesne assignments, to the United States of America as represented by the Secretary of the Navy Filed Aug. 28, 1962, Ser. No. 220,109
6 Claims. (Cl. 329—101)

This invention relates to detector circuits and more particularly to a transistor linear peak detecting circuit having a negative feedback for varying the detector amplifier gain inversely proportional to input signal amplitude to detect voltage signals over a wide dynamic range and of variable signal strength.

In the past linear peak detection has been accomplished over small dynamic ranges and only with large signals. Feedback circuits are often used to cause the detector to operate over the most favorable part of its characteristic curve or to return in-phase signals to the detector to augment signal operation over the linear portion of the detector. The dynamic range of the detector is limited in the tube or transistor detector circuits by the fixed or predetermined biases established. If the bias is fixed for small signals and high gain, large signals would be distorted and could not be properly detected, and, likewise, if the bias is fixed for large signals and low gain, the small signals could not be detected. It is necessary in certain applications to linearly peak detect alternating current (A.C.) voltages over large dynamic ranges.

This invention shows and describes a means whereby both dynamic range and small signal sensitivity have been increased. Small signal sensitivity has been increased by the use of two high gain amplifier stages with a direct current (D.C.) negative feedback. The feedback is used to re-establish or vary the bias level of the first stage thereby making it possible to detect both low level signals, in the order of 50 millivolts peak, and high level signals, in the order of 5 volts peak. This feedback maintains a closed loop gain of unity and an open loop gain of several hundred. The negative feedback is produced from the output of one emitter follower coupled to the amplifier and the detected output is provided by a second emitter follower coupled to the output of the amplifier. It is therefore a general object of this invention to provide a transistor peak detector circuit having a negative feedback circuit to control the gain of the detector inversely proportional to the amplitude of the input signal to thereby detect alternating current signals over a wide dynamic range.

Figure 1:
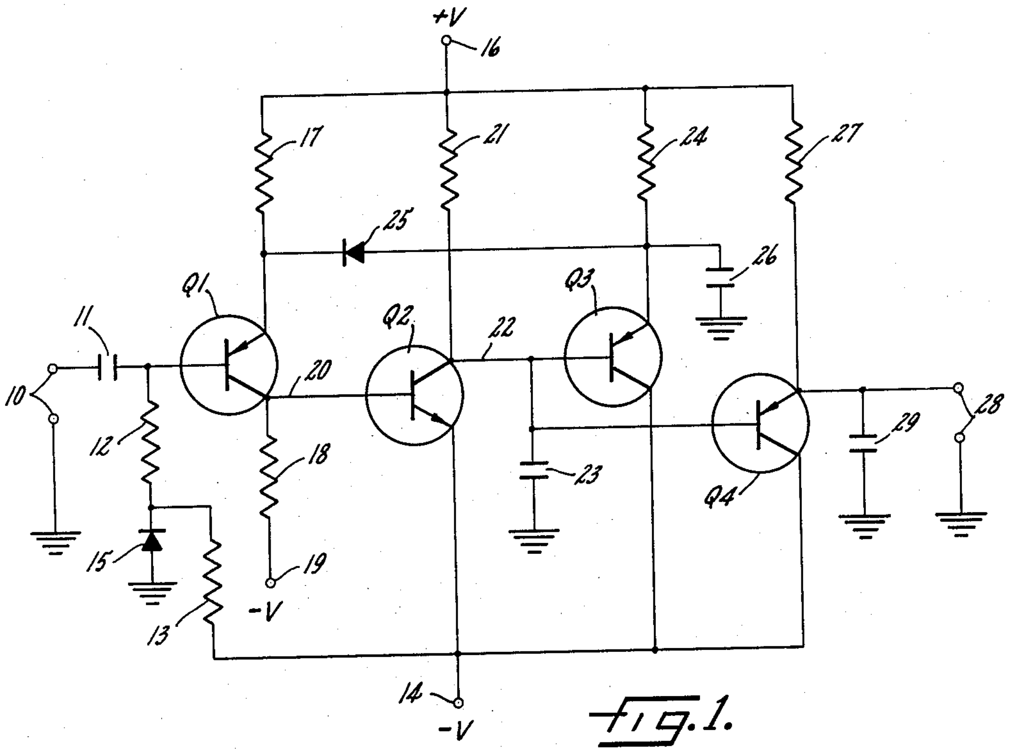
Figure 2:
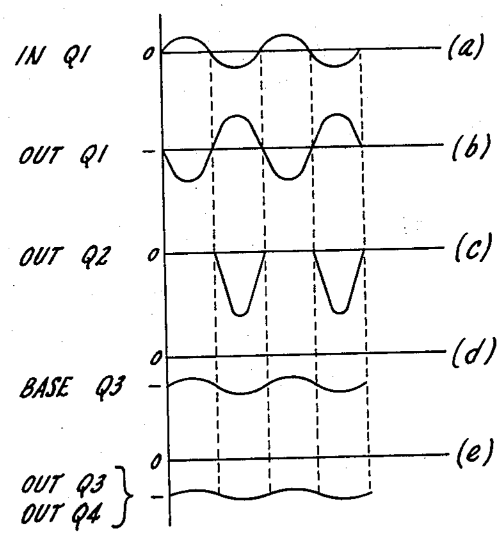

These and other objects and the attendant advantages will become more apparent to those skilled in the art as the description proceeds when considered along with the accompanying drawing in which:

FIGURE 1 is a circuit schematic of a preferred form of the transistor detector circuit, and FIGURE 2 illustrates waveforms occurring at various points in FIGURE 1.

Referring more particularly to FIGURE 1, an A.C. input signal to be detected is adapted to be applied to the circuit of this invention at the input terminals 10 which signals are conducted through the coupling capacitor 11 to the base of the first stage of a high gain transistor amplifier Q1. The base of transistor Q1 is biased through a network comprising resistors 12 and 13 to a negative voltage source applied at the terminal 14, the terminal connecting the resistors 12 and 13 being connected to a fixed potential such as ground through a diode 15. Diode 15 is oriented to produce a current flow from ground through the diode and resistor 13 to the negative voltage source 14 to establish the desired bias across resistance 12 on the base of transistor Q1. The emitter of transistor Q1 is coupled to a positive voltage source applied at terminal 16 through a resistor 17. The collector of transistor Q1 is coupled through a resistor 18 to a negative potential applied at terminal 19, the negative potential at terminal 19 being higher in the negative direction than the negative potential at terminal 14. Resistors 12, 13, 17, and 18 are so chosen that transistor Q1 is normally maintained in conduction. A.C. signal voltages applied to the terminals 10 will be amplified and inverted on the collector output conductor 20 of the transistor Q1.

The second stage of the high gain amplifier is produced by a transistor amplifier Q2 having its base directly coupled to the collector output conductor 20 of transistor Q1. The emitter of transistor Q2 is directly coupled to the negative voltage source 14, and the collector thereof is coupled through a collector load resistor 21 to the positive voltage source 16. The resistors 17 and 18 are so chosen for the conductive state of transistor Q1 to establish a potential on the collector output 20 of resistor Q1, in the absence of an input signal on the terminals 10, to make the base voltage of transistor Q2 substantially equal to its emitter voltage. Any amplified A.C. signal voltages applied over the conductor 20 from the first stage to the base of transistor Q2 will produce a rectified and inverted signal on the collector output 22 of transistor Q2.

A pair of emitter follower transistors Q3 and Q4 has their bases coupled in common to the collector output 22 of transistor Q2 so that the rectified output of transistor Q2 will be applied to these base circuits in like manner. The common coupling of the base circuits of transistor emitter followers Q3 and Q4 is connected to one plate of a storage capacitor 23, the other plate of which is coupled directly to ground potential. The capacitor 23 serves the function of storing the rectified and amplified portions of the A.C. input voltage signal to build up substantially to the peak voltage of these rectified portions and thereby acts somewhat as a smoothing capacitor to provide a D.C. voltage on the bases of transistor followers Q3 and Q4. The emitter of transistor Q3 is coupled through a resistor 24 to the positive voltage source 16 and likewise coupled through a diode 25 to the emitter of transistor Q1. The emitter of transistor Q3 is coupled to one plate of a capacitor 26, the other plate of which is connected directly to ground. The coupling of the emitters of transistors Q1 and Q3 through the diode 25 provides a feedback circuit from the emitter follower transistor Q3 to the emitter of transistor amplifier Q1 and prevents emitter voltage supplied through the resistor 17 from being applied to the emitter of Q3. The resistance of resistor 24 is substantially less than the resistance of 18, and the diode 25 is oriented with the cathode thereof coupled to the emitter of transistor Q1 thereby establishing the principal flow of current through the transistor Q1 in its conductive state through the path from the positive voltage source 16, resistance 24, diode 25, transistor Q1, and resistance 18 to the negative voltage source 19. The resistance of resistor 17 is considerably higher than the resistance of either 18 or 24 and serves the purpose of maintaining the transistor Q1 in a conductive state irrespective of the bias established on the emitter of Q1 by the resistance 24 and the feedback voltage. It should be readily understood that resistance 24 therefore establishes the principal bias for the emitter of transistor Q1 and the emitter bias for the transistor Q3. The collector of transistor Q3 is directly coupled to the negative voltage source at terminal 14 in common with the collector of transistor Q4. The emitter of transistor Q4 is loaded through a resistor 27 from the positive voltage source 16 and the output circuit at terminals 28 is taken from the emitter of transistor Q4. The emitter of transistor Q4 is also coupled to one plate of a capacitor 29, the other plate of which is directly coupled to ground potential. The emitter output of transistor Q3, providing a feedback through the diode 25 to the emitter of transistor Q1, is further smoothed by the capacitor 26 while the output of the emitter of transistor Q4 to the output terminals 28 is further smoothed by the capacitor 29 to reduce as much as possible the ripple in the D.C. voltage applied to the bases of transistors Q3 and Q4.

To provide one example of values to the voltage applied to the circuit of FIGURE 1, let it be assumed, purely for the purpose of establishing an operative example, that the negative voltage applied to terminal 14 is −15 volts, the positive voltage applied to the terminal 16 is +15 volts, and the negative voltage applied to terminal 19 is −28 volts. The resistors 12 and 13 may be so chosen to establish, by virtue of conduction through the diode 15 and resistance 13, a voltage of approximately −.5 on the base of transistor Q1. Likewise, the resistors 24 and 18 may be so chosen to establish approximately a −15 volts on the collector output 20 of the transistor Q1 and, consequently, this voltage is applied to the base of transistor Q2 making the base and emitter voltage of transistor Q2 approximately equal in the absence of any A.C. input signal on terminals 10. The resistor 21 may be so chosen to provide a very slightly negative potential at the collector of transistor Q2 and, consequently, on the bases of transistors Q3 and Q4 which, with a proper choice of resistance 27, the emitter of transistor Q4 will be established at substantially ground potential. While other voltages may be applied to terminals 14, 16, and 19 than given herein, as an example, and other resistance choices may be made to establish other voltages at the emitters or collectors of the several transistors, these voltages and resistor values are given herein purely for the purpose of example and are not in any way to limit the scope or application of the circuit shown and described for this invention.

*Operation*

In the operation of the circuit of FIGURE 1 with occasional reference to FIGURE 2, let it be assumed that the values of the above example are used to produce the peak detection results of the circuit. In the absence of any A.C. input signal, transistor Q1, being of the P-N-P type, will be in its conductive state by virtue of the base being biased slightly negative with a positive voltage on the emitter and a negative voltage on the collector. As hereinbefore stated in the description, the principal flow of current through transistor Q1 is from the positive voltage source 16, through the resistor 24 and diode 25, and to the negative voltage source at 19. This establishes a substantially −15 volts on the base of transistor Q2 which is conductive to establish a very slightly negative potential on the collector output conductor 22 to hold transistor emitter followers Q3 and Q4 in a conductive state to establish substantially ground potential on the emitter output of transistor Q4. Upon the application of an A.C. input signal to terminals 10, illustrated on line (*a*) in FIGURE 2, this input signal will be amplified as shown by line (*b*) in FIGURE 2 on the collector output 20 of transistor Q1. Since Q2 is of the N-P-N type and is operating close to its cutoff voltage, only the positive portions of the amplified signal (*b*) of FIGURE 2 will be amplified on the collector output 22 of transistor Q2 as shown in line (*c*) of FIGURE 2. The transistors Q1 and Q2 therefore produce a rectified and amplified output of the A.C. input signal applied at terminals 10. Transistors Q3 and Q4 are of the P-N-P type and, as biased, the emitter voltages will follow the base voltages of these transistors. The storage capacitor 23 stores the rectified negative portions of the A.C. input signal as shown by (*c*) to produce a negative D.C. voltage illustrated in line (*d*) of FIGURE 2. The emitter of transistor Q3 will follow this rippled D.C. voltage which will be still further smoothed by the capacitor 26 and applied through the diode 25 reducing the bias voltage applied from the positive source 16 through the resistor 24 on the emitter of transistor Q1 proportional to the amplitude of the A.C. input signal. The output D.C. voltage will also be produced at terminals 28 which voltage is smoothed by the capacitor 29 to produce the rectified and smoothed D.C. voltage as shown in line (*e*) of FIGURE 2. For very small input signals (*a*) there will be produced very small negative feedback through the diode 25, reducing the positive bias on the emitter of transistor Q1 very slightly, which would only slightly reduce the high gain of transistor Q1 so that small A.C. signals, such as (*a*), will readily be detected on the output 28 of the circuit. On the other hand, if the A.C. signal (*a*) is large in amplitude, the negative feedback from the emitter of transistor Q3 will produce a greater voltage drop across resistor 24 thereby reducing the positive voltage on the emitter of transistor Q1 to greatly reduce the gain of this transistor whereby transistors Q1 through Q4 will not be driven to saturation to cause any distortion of the rectified or detected A.C. input signal on the output terminals 28. It has been found that low amplitude A.C. input signals in the order of 50 millivolts peak will be detected on the output 28 and, in like manner, large amplitude signals in the order of 5 volts peak will also be detected on the output 28 of the circuit without distortional effects. The negative feedback from the emitter of transistor Q3, in effect, varies the positive bias voltage on the emitter of transistor Q1 to vary the gain of the transistor amplifier Q1 inversely proportional to the amplitude of the A.C. input signal such that small level signals are subjected to the highest possible gain of Q1 and Q2 and the gain of transistor Q1 is greatly reduced for high level signals thereby providing detection over a wide dynamic range of input signals. In some applications where the circuit coupled to the output terminals 28 does not require high current flow, Q4 could be eliminated and the output taken from the emitter of Q3.

While many modifications and changes may be made in the constructional details of this invention by a change of polarities and a change of N-P-N type or P-N-P type transistors or by rearranging the voltages and resistance values to meet the needs of certain applications, we desire to be limited in the spirit and scope of our invention only by the scope of the appended claims.

We claim:

1. A detector for detecting alternating current voltage signals of small signal strength and over a wide dynamic range comprising:

an input for an alternating current voltage signal to be detected;

an amplifier having first and second transistor stages, the first stage having the base coupled to said input and the emitter and collector each coupled through a resistor to the positive and negative sides, respectively, of a voltage source, and the second stage having the base coupled to the collector of the first stage and the emitter and collector coupled across the positive and negative sides, respectively, of said voltage source with said collector coupling being through a resistor;

a first emitter follower stage having the base thereof coupled to the collector of said second stage transistor amplifier, the emitter coupled through a diode to the emitter of said first transistor amplifier stage to provide a negative feedback and through a resistor to said positive voltage source, and the collector coupled to said negative voltage source;

a second emitter follower having the base coupled to the collector of said second transistor amplifier, the emitter coupled to an output and through a resistor to said positive voltage source, and the collector coupled to said negative voltage source; and a storage means coupled to the common coupling of the collector of said second transistor amplifier and the bases of said first and second transistor emitter followers whereby input signals are rectified to produce a direct current output proportional to said input signals and said negative feedback varies the emitter bias of said first transistor amplifier to produce high gain for small input signals and low gain for large input signals.

2. A detector as set forth in claim 1 wherein said first transistor amplifier stage is emitter biased from the resistor connecting the emitter of said first emitter follower through said diode and biased to produce continuous conduction by said resistor connecting the emitter of said first amplifier stage to said positive voltage source, and said second transistor amplifier stage is an inverter detector amplifier for applying amplified and detected voltage signals proportional to the amplitude of the alternating current input voltage signals to the storage means and the bases of said first and second emitter followers.

3. A detector as set forth in claim 2 wherein said storage means is a capacitor having one plate coupled to said common coupling of said collector of said second transistor amplifier and the bases of said first and second emitter followers and the other plate coupled to a fixed potential; and said negative feedback includes a capacitor having one plate coupled to the emitter of said first emitter follower and the other plate thereof coupled to said fixed potential.

4. A detector for detecting alternating current voltage signals of small signal strength and over a wide dynamic range comprising:

an input of signals to be detected;

an amplifier having first and second triode electron emission amplifier stages, each stage having a control electrode and two conduction electrodes coupled in a voltage biasing circuit with the control electrode of the first stage being coupled to said signal input, one of the conduction electrodes coupled to the control electrode of said second stage, and one of the conduction electrodes of the second stage constituting the amplifier output, said second stage amplifier being biased from said voltage biasing circuit to produce rectification of amplified signals;

a triode electron emission follower means coupled in said voltage biasing circuit having a control electrode means coupled to said amplifier output and having a conduction electrode means and a follower conduction electrode means with an output taken from said follower conduction electrode means;

a feedback coupling said follower conduction electrode means through a diode with the other conduction electrode of said first amplifier stage to vary the bias on said first amplifier stage conduction electrode inversely proportional to input signal amplitude; and a storage means coupled to said amplifier output and a storage means coupled to the output of said follower conductive electrode means whereby input signals are detected and amplified in said first and second triode electron emission amplifier stages and the detected signals accumulated and smoothed into direct current voltage by said storage means for producing a direct current on the output of said triode electron emission means and on said feedback through said diode to increase the gain of low amplitude input signals and to decrease the gain of high amplitude input signals.

5. A detector for detecting alternating current voltage signals as set forth in claim 4 wherein said triode electron emission amplifier stages and said triode electron emission followers are transistors, and said storage means are capacitors.

6. A detector for detecting alternating current voltage signals as set forth in claim 5 wherein said transistor follower means comprise two transistor followers in which their control electrodes are the base electrodes coupled in common and in which the emitter electrodes constitute said follower conduction electrode means, the emitter of one transistor follower being coupled as said feedback coupling and the emitter of the other transistor follower being said output.

References Cited in the file of this patent

UNITED STATES PATENTS

| | | |
|---|---|---|
| 2,858,423 | Stern | Oct. 28, 1958 |
| 3,012,137 | Riceman | Dec. 5, 1961 |
| 3,023,368 | Erath | Feb. 27, 1962 |
| 3,098,199 | Carney et al. | July 16, 1963 |